United States Patent
Havens et al.

(10) Patent No.: US 8,256,678 B2
(45) Date of Patent: Sep. 4, 2012

(54) INDICIA READING TERMINAL HAVING IMAGE SENSOR AND VARIABLE LENS ASSEMBLY

(75) Inventors: William H. Havens, Syracuse, NY (US); Timothy P. Meier, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 244 days.

(21) Appl. No.: 12/540,168

(22) Filed: Aug. 12, 2009

(65) Prior Publication Data
US 2011/0036911 A1    Feb. 17, 2011

(51) Int. Cl.
*G06K 7/10* (2006.01)

(52) U.S. Cl. ......... 235/462.14; 235/462.01; 235/462.08; 235/462.15; 235/462.23; 235/462.45; 235/462.46; 235/462.48; 235/462.49; 235/470; 235/472.01

(58) Field of Classification Search .............. 235/454, 235/462.01, 462.07–462.12, 462.14, 462.15, 235/462.2–462.26, 462.45–462.49, 472.01–472.03, 235/462.36

See application file for complete search history.

(56) References Cited

U.S. PATENT DOCUMENTS

| | | | |
|---|---|---|---|
| 5,378,883 | A | 1/1995 | Batterman et al. |
| 5,576,529 | A | 11/1996 | Koenck et al. |
| 5,756,981 | A | 5/1998 | Roustaei et al. |
| 5,811,828 | A | 9/1998 | Laser |
| 5,814,803 | A | 9/1998 | Olmstead et al. |
| 6,123,261 | A * | 9/2000 | Roustaei ............... 235/462.01 |
| 6,611,060 | B1 * | 8/2003 | Toyoda et al. ............... 257/758 |
| 7,227,117 | B1 | 6/2007 | Lackemann et al. |
| 7,240,844 | B2 | 7/2007 | Zhu et al. |
| 7,568,628 | B2 | 8/2009 | Wang et al. |
| 7,611,060 | B2 | 11/2009 | Wang et al. |
| 7,762,466 | B2 * | 7/2010 | Tan et al. ............... 235/462.42 |
| 7,813,047 | B2 | 10/2010 | Wang et al. |
| 7,909,257 | B2 | 3/2011 | Wang et al. |
| 7,918,398 | B2 * | 4/2011 | Li et al. ............... 235/462.41 |

(Continued)

OTHER PUBLICATIONS

European Patent Office, Communication pursuant to Article 94(3) EPC for European Application No. 10172321.1, dated Dec. 1, 2010 (5 pages).

(Continued)

*Primary Examiner* — Tuyen K Vo
(74) *Attorney, Agent, or Firm* — Heslin Rothenberg Farley & Mesiti P.C.

(57) ABSTRACT

There is described an image sensor based indicia reading terminal comprising a variable setting imaging lens having a first setting at which the terminal has a first plane of optimum focus and a second setting at which the terminal has a second plane of optimum focus. According to one embodiment, a first predetermined picture size where picture size is determined according to a number of pixels subject to read out, can be associated to the first lens setting and a second picture size can be associated to the second lens setting such that the terminal with the lens setting set to the first setting reads out a frame of a first picture size and with the lens setting set to a second setting reads out a frame of a second picture size. In addition to or in place of the picture size operational parameters, different operational parameters can be associated to the respective first and second lens settings. Additionally or alternatively, different processes for determining an operational parameter and/or different algorithms for determining an operational parameter can be associated to each of the first and second lens settings.

19 Claims, 5 Drawing Sheets

U.S. PATENT DOCUMENTS

| | | |
|---|---|---|
| 7,946,493 B2 | 5/2011 | Havens et al. |
| 8,027,095 B2 | 9/2011 | Havens |
| 8,038,066 B2 | 10/2011 | Havens et al. |
| 2004/0118928 A1 | 6/2004 | Patel et al. |
| 2006/0011724 A1 | 1/2006 | Joseph et al. |
| 2006/0202036 A1 | 9/2006 | Wang et al. |
| 2006/0202038 A1* | 9/2006 | Wang et al. .............. 235/462.24 |
| 2007/0063048 A1* | 3/2007 | Havens et al. ........... 235/462.46 |
| 2007/0069030 A1* | 3/2007 | Sauerwein et al. ...... 235/462.46 |
| 2007/0102520 A1 | 5/2007 | Carlson et al. |
| 2007/0164115 A1 | 7/2007 | Joseph et al. |
| 2008/0245872 A1 | 10/2008 | Good |
| 2009/0026267 A1 | 1/2009 | Wang et al. |
| 2009/0072037 A1 | 3/2009 | Good et al. |
| 2009/0108071 A1 | 4/2009 | Carlson |
| 2010/0276490 A1 | 11/2010 | Havens et al. |
| 2010/0276491 A1 | 11/2010 | Havens et al. |
| 2010/0276492 A1 | 11/2010 | Wang et al. |
| 2010/0276493 A1 | 11/2010 | Havens et al. |
| 2011/0036908 A1 | 2/2011 | Havens et al. |
| 2011/0036911 A1 | 2/2011 | Havens et al. |
| 2011/0089245 A1 | 4/2011 | Havens et al. |
| 2011/0163165 A1 | 7/2011 | Liu et al. |
| 2011/0174880 A1 | 7/2011 | Li et al. |

OTHER PUBLICATIONS

European Patent Office, European Search Report for European Application No. 10172321.1, dated Nov. 16, 2010 (3 pages).

U.S. Appl. No. 12/242,244, filed Sep. 30, 2008, Entitled Method and Apparatus for Operating Indicia Reading Terminal Including Parameter Determination.

U.S. Appl. No. 12/335,777, filed Dec. 16, 2008, Entitled Indicia Reading Terminal Including Frame Processing.

* cited by examiner

INDICIA READING TERMINAL HAVING IMAGE SENSOR AND VARIABLE LENS ASSEMBLY

FIELD OF THE INVENTION

The present invention relates in general to optical based registers, and particularly is related to an image sensor based indicia reading terminal.

BACKGROUND OF THE INVENTION

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button (trigger) that can be actuated by an index finger. Indicia reading terminals having keyboards and displays are also available. Keyboards and display equipped indicia reading terminals are commonly used in shipping and warehouse applications, and are available in form factors incorporating a display and keyboard. In a keyboard and display equipped indicia reading terminal, a trigger button for actuating the output of decoded messages is typically provided in such locations as to enable actuation by a thumb of an operator. Indicia reading terminals in a form devoid of a keyboard and display or in a keyboard and display equipped form are commonly used in a variety of data collection applications including point of sale applications, shipping applications, warehousing applications, security check point applications, and patient care applications. Some indicia reading terminals are adapted to read bar code symbols including one or more of one dimensional (1D) bar codes, stacked 1D bar codes, and two dimensional (2D) bar codes. Other indicia reading terminals are adapted to read OCR characters while still other indicia reading terminals are equipped to read both bar code symbols and OCR characters.

SUMMARY OF THE INVENTION

There is described an image sensor based indicia reading terminal comprising a variable setting imaging lens having a first setting at which the terminal has a first plane of optimum focus and a second setting at which the terminal has a second plane of optimum focus. According to one embodiment, a first predetermined picture size where picture size is determined according to a number of pixels subject to read out, can be associated to the first lens setting and a second picture size can be associated to the second lens setting such that the terminal with the lens setting set to the first setting reads out a frame of a first picture size and with the lens setting set to a second setting reads out a frame of a second picture size. In addition to or in place of the picture size operational parameters, different operational parameters can be associated to the respective first and second lens settings. Additionally or alternatively, different processes for determining an operational parameter and/or different algorithms for determining an operational parameter can be associated to each of the first and second lens settings.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
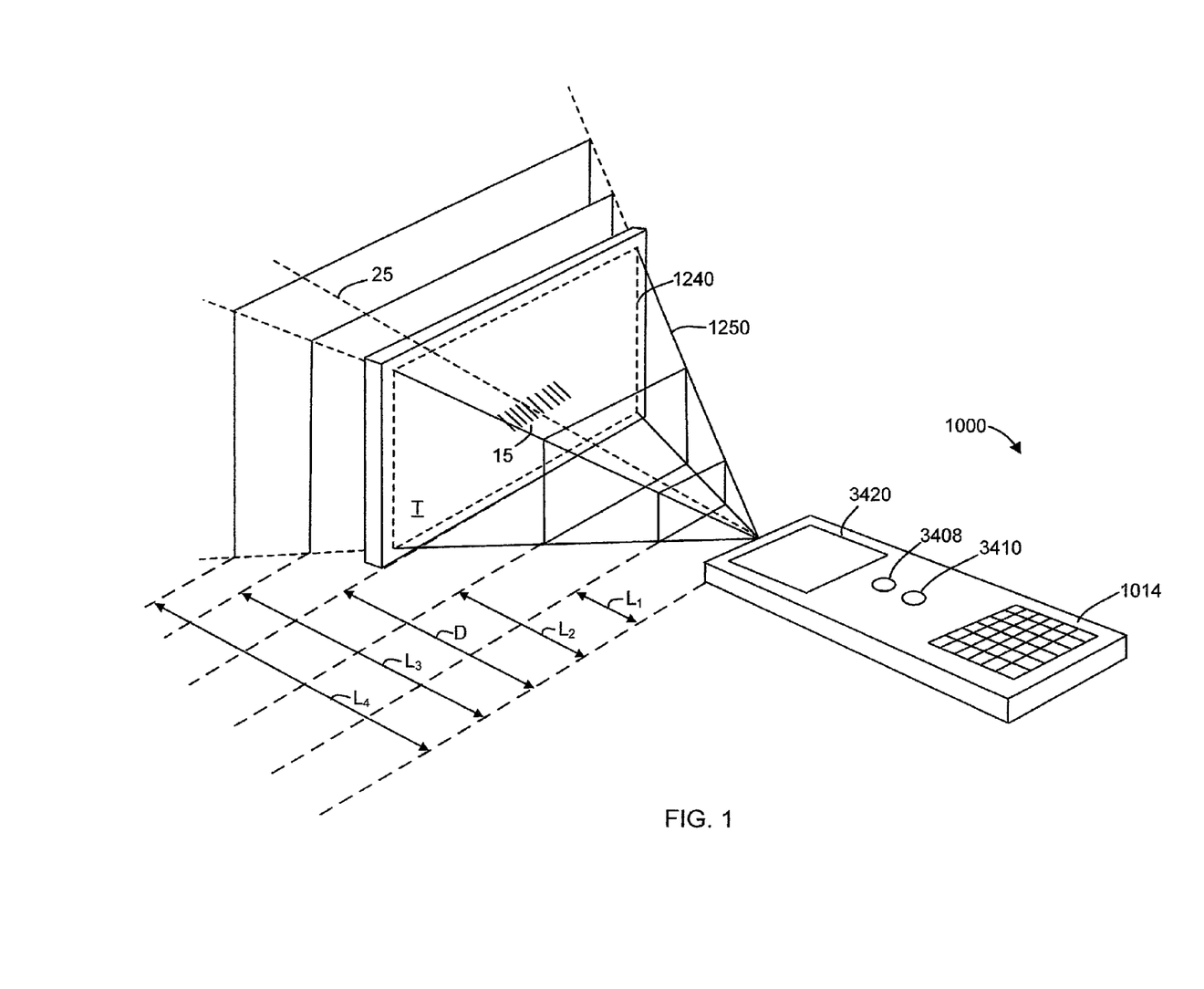
FIG. 1 is a perspective view of an image sensor based indicia reading terminal having a variable focus lens assembly in one embodiment.

There is described an image sensor based indicia reading terminal 1000 having a variable setting imaging lens assembly that includes a first setting at which the terminal has a first plane of optimum focus (best focus distance) and a second setting at which the terminal has a second plane of optimum focus. Such settings, therefore, can be regarded as plane of optimum focus (or best focus distance) lens settings. Referring to FIG. 1, an indicia reading terminal 1000 can be operative to capture and process a frame of image data representing a portion of a target, T, such as a substrate, e.g., a piece of paper within a field of view 1240 of terminal 1000. On the target, T, there can be disposed a decodable indicia 15, e.g., a bar code symbol. During reading, terminal 1000 can be positioned at a distance, D, from the target, T, as is shown in FIG. 1. By virtue of terminal 1000 having a variable lens assembly, a plane of optimum focus of terminal 1000 can be varied, e.g., between a first lens setting at which a plane of optimum focus of terminal 1000 is at terminal to target distance $L_1$, and a second lens setting at which a plane of optimum focus of terminal 1000 is at terminal to target distance $L_2$. Terminal 1000 can be operative so that additional lens settings are possible, e.g., a third lens setting at which a plane of optimum focus of terminal 1000 is defined at terminal to target distance $L_3$ and a fourth lens setting at which a plane of optimum focus of terminal 1000 is defined at a farther terminal to target distance, $L_4$. In theory, an infinite number of additional lens settings including intermediate settings are possible. With reference to the field of view 1240 indicated in the view of FIG. 1, it is understood that while several different planes of optimum focus are indicated in the view within cone 1250 having a certain projection angle and defining field of view 1240, the lens assembly projection angle of cone 1250 defining field of view 1240 may change as a lens setting of a terminal's lens assembly changes.

In addition, as will be described herein, terminal 1000 can be operative to have a first functionality wherein during an operator initiated read attempt, a lens setting of a lens assembly is varied and a second functionality wherein a lens setting remains fixed during an operator activated read attempt, but which can be subject to adjustment intermediate of first and second operator activated read attempts in response to an operator input command input to terminal 1000 between first and second operator activated read attempts.

Terminal 1000 can be operative so that at a first time during an operator activated read attempt, an actual present reading distance of terminal 1000 may be spaced apart significantly from a present plane of optimum focus distance lens setting of terminal 1000. Nevertheless, at a second time during an operator activated read attempt, an actual present terminal to target distance, D, of terminal 1000 can closely correspond to and be in proximity with a plane of optimum focus lens setting of terminal 1000. Operating in accordance with the first functionality, a varying plane of optimum focus lens setting may converge on an actual terminal to target distance during an operator activated read attempt in which a succession of frames are exposed, read out, captured, and subject to processing. Operating according to the second functionality, terminal 1000, if portable, can be moved by an operator during an operator activated read attempt into a position at which a current terminal to target distance closely corresponds to and is proximate to the plane of optimum focus setting. Also, according to the second functionality, a substrate bearing a decodable indicia can be brought into proximity with terminal 1000 during an operator activated read attempt.

According to one embodiment, a first picture size can be associated to the first lens setting and a second picture size can be associated to the second lens setting such that the terminal with the lens setting set to the first lens setting reads out a frame of a first picture size and with the lens setting set to a second setting reads out a frame of a second picture size.

In addition to or in place of the picture size operational parameter, different operational parameters can be associated to the respective first and second lens settings.

One such operational parameter is frame exposure level; another operational parameter is amplifier gain; another operational parameter is initial exposure period; another operational parameter is initial amplifier gain.

Additionally or alternatively, different processes for determining an operational parameter and/or different algorithms for determining an operational parameter can be associated to each of the first and second lens settings.

For example, a first process and/or algorithm for controlling exposure level can be active when the lens setting is at the first lens setting and a second process and/or algorithm for controlling exposure level can be active when the lens setting is at the second lens setting. Also, a first process and/or algorithm for controlling amplifier gain can be active when the lens setting is at the first lens setting and a second process and/or algorithm for controlling amplifier gain can be active when the lens setting is at the second lens setting.

In development of a variable lens setting indicia reading terminal described herein, it was determined that decoding of frames exposed with the terminal highly out of focus (i.e., with the terminal at a terminal to target distance significantly spaced apart from a distance corresponding to the plane of optimum focus distance of the present lens setting) will normally fail as a result of the terminal being out of focus irrespective of whether operational controls are optimized for the actual current reading distance of the terminal. Accordingly, in one embodiment, an indicia reading terminal is operative so that operational parameters of the terminal are optimized for reading distances corresponding to the plane of optimum focus of the current setting of the terminal's lens assembly.

In one embodiment, a lens setting of a terminal's lens assembly can be controlled on an open loop basis, i.e., without reference to either a ranging parameter or a focus determination or another determined condition. In such an embodiment, the terminal can be operative so that operational parameters of the terminal are optimized for reading distances corresponding to the plane of optimum focus of the current setting of the terminal's lens assembly irrespective of whether the plane of optimum focus distance of the current lens setting is proximate to the current actual terminal to target distance. Operative as described, a likelihood of successful reading and expected read time can be improved. In another embodiment, terminal 1000 can incorporate range detection functionality and a lens setting of a lens assembly of terminal 1000 can be set according to the detected range.

A hardware platform for support of operations described herein with reference to an image sensor based indicia reading terminal is shown and described with reference to FIGS. 1-7.

Figure 2:
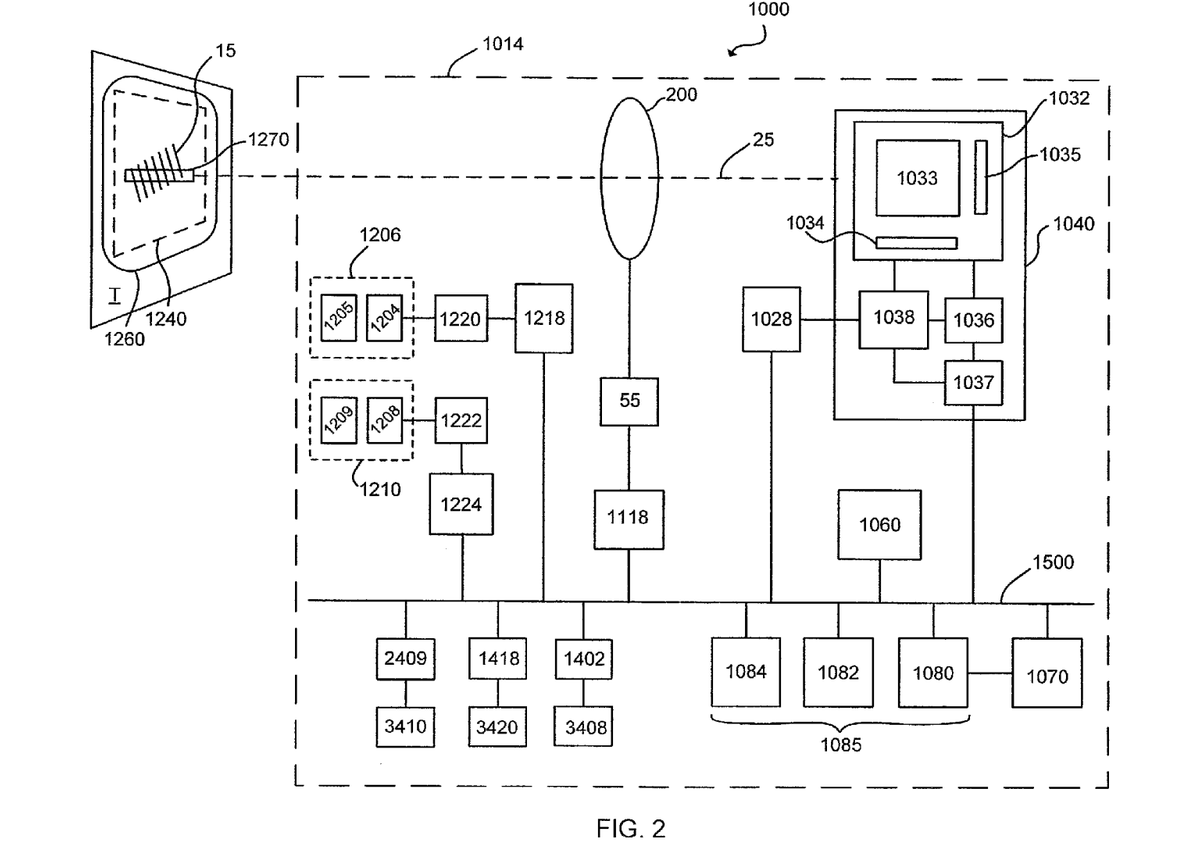
FIG. 2 is a block diagram of an image sensor based indicia reading terminal having a variable focus lens assembly in one embodiment.

Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. In one example, image sensor integrated circuit 1040 can be provided e.g., by an MT9V022 (752×480 pixel array) or an MT9V023 (752×480 pixel array) image sensor integrated circuit available from Micron Technology, Inc. In one example, image sensor integrated circuit 1040 can incorporate a Bayer pattern filter, so that defined at the image sensor array are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, CPU 1060 prior to subjecting a frame to further processing can interpolate pixel values at frame pixel positions intermediate of green pixel positions utilizing green pixel values for development of a monochrome frame of image data. Alternatively, CPU 1060 prior to subjecting a frame for further processing can interpolate pixel values intermediate of red pixel positions utilizing red pixel values. CPU 1060 can alternatively prior to subjecting a frame for further processing can interpolate pixel values intermediate of blue pixel positions utilizing blue pixel values.

In the course of operation of terminal 1000, image signals can be read out of image sensor 1032, converted, and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of terminal 1000, lens assembly 200 can be adapted for focusing an image of a decodable indicia 15 located within a field of view 1240 on a substrate, T, onto image sensor array 1033. Imaging light rays can be transmitted about imaging axis 25. Lens assembly 200 can be adapted to be capable of multiple focal lengths and multiple best focus distances.

Terminal 1000 can also include an illumination pattern light source bank 1204 and associated light shaping optics 1205 for generating an illumination pattern 1260 substantially corresponding to a field of view 1240 of terminal 1000. The combination of bank 1204 and optics 1205 can be regarded as an illumination pattern generator 1206. Terminal 1000 can also include an aiming pattern light source bank 1208 and associated light shaping optics 1209 for generating an aiming pattern 1270 on a target, T, which can be provided by a substrate. The combination of bank 1208 and optics 1209 can be regarded as an aiming pattern generator 1210. In use, terminal 1000 can be oriented by an operator with respect to a target, T, (e.g., a substrate, a piece of paper, a package) bearing decodable indicia 15 in such manner that aiming pattern 1270 is projected on a decodable indicia 15. In the example of FIG. 2, decodable indicia 15 is provided by a 1D bar code symbol. Decodable indicia 15 could also be provided by a 2D bar code symbol or optical character recognition (OCR) characters. Each of illumination pattern light source bank 1204 and aiming pattern light source bank 1208 can include one or more light sources. Lens assembly 200 can be controlled with use of electrical power input unit 55 which provides energy for changing a plane of optimal focus of lens assembly 200. In one embodiment, an electrical power input unit 55 can operate as a controlled voltage source, and in another embodiment, as a controlled current source. Illumination pattern light source bank 1204 can be controlled with use of illumination pattern light source control circuit 1220. Aiming pattern light source bank 1208 can be controlled with use of aiming pattern light source bank control circuit 1222. Electrical power input unit 55 can apply signals for changing optical characteristics of lens assembly 200, e.g., for changing a focal length and/or a best focus distance of (a plane of optimum focus of) lens assembly 200. Illumination pattern light source bank control circuit 1220 can send signals to illumination pattern light source bank 1204, e.g., for changing a level of illumination output by illumination pattern light source bank 1204. Aiming pattern light source bank control circuit 1222 can send signals to aiming pattern light source bank 1208, e.g., for changing a level of illumination output by aiming pattern light source bank 1208. It has been mentioned that terminal 1000 can incorporate range detection functionality. In one embodiment, terminal 1000 can be operative so that aiming pattern 1270 is projected with use of collimating optics so that a position of aiming pattern 1270 within field of view 1240 varies and can further be operative so that a present terminal-to-target distance of terminal 1000 is accordingly determined based on a determined position of a representation of aiming pattern 1270 within a frame representing field of view 1240. Additional aspects of lens assembly 200 are now described.

Figure 3:
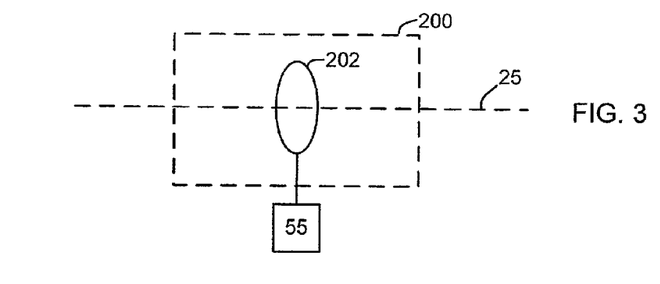
FIG. 3 is a schematic diagram of a variable lens setting lens assembly in one embodiment.

In the embodiment of FIG. 3, lens assembly 200 comprises a fluid lens 202. Fluid lens 202 in one embodiment can be an electrowetting fluid lens comprising a plurality of immiscible optical fluids. Fluid lens 202 in one embodiment can be provided by an ARCTIC 314 or ARCTIC 316 fluid lens of the type available from VARIOPTIC S.A. of Lyon, France. Fluid lens 202 can alternatively be a fluid lens of the type having a deformable surface, and can be provided in association with a mechanical actuator assembly (not shown) coupled to power input unit 55.

Figure 4:
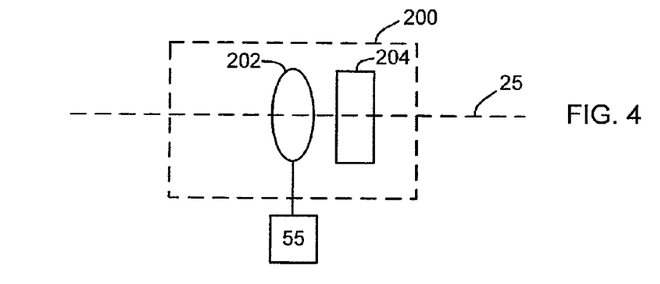
FIG. 4 is a schematic diagram of a variable lens setting lens assembly in one embodiment.
Figure 5:
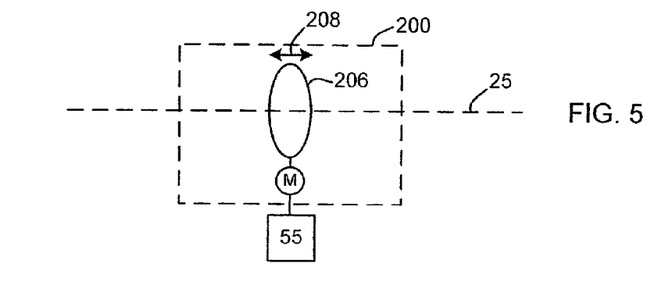
FIG. 5 is a schematic diagram of a variable lens setting lens assembly in one embodiment.

Referring to FIG. 4, lens assembly 200 can include one or more lenses in series with fluid lens 202. In the embodiment of FIG. 4, lens 204 can be e.g., a glass or polycarbonate lens, or a fluid lens. In the embodiment of FIG. 5, lens assembly 200 comprises a mechanically movable lens 206. Lens 206, in one embodiment, can be provided by solid light transmissive material e.g., glass or polycarbonate, and can be moved with use of motor force provided by motor, M, coupled to power input unit 55. In one embodiment, motor, M, can be provided by a hollow stepper motor and lens 206 can be disposed within such hollow stepper motor so that lens 206 is moved between various positions along axis 25 as is indicated by bidirectional arrow 208. Lens assembly 200 as shown in FIG. 5 can also include additional lenses such as lens 204 disposed in series with lens 206.

Terminal 1000 can also include a number of peripheral devices including trigger 3408 which may be used to make active a trigger signal for activating frame readout and/or certain decoding processes. Terminal 1000 can be adapted so that activation of trigger 3408 activates a trigger signal and initiates a decode attempt. Specifically, terminal 1000 can be operative so that in response to activation of a trigger signal, a succession of frames can be read out and captured by way of read out of image information from image sensor array 1033 (typically in the form of analog signals) and then storage of the image information after conversion into memory 1080 (which can buffer one or more of the succession of frames at a given time). CPU 1060 can be operational to subject one or more of the succession of frames to a decode attempt. For attempting to decode a bar code symbol, e.g., a one dimensional bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup.

Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1118 for coupling electrical power input unit 55 to system bus 1500, interface circuit 1218 for coupling illumination light source bank control circuit 1220 to system bus 1500, interface circuit 1224 for coupling aiming light source bank control circuit 1222 to system bus 1500, and interface circuit 1402 for coupling trigger 3408 to system bus 1500. Terminal 1000 can also include a display 3420 coupled to system bus 1500 and in communication with CPU 1060, via interface 1418, as well as pointer mechanism 3410 in communication with CPU 1060 via interface 2409 connected to system bus 1500.

A succession of frames of image data that can be captured and subject to the described processing can be full frames (including pixel values corresponding to each pixel of image sensor array 1033 or a maximum number of pixels read out from array 1033) during operation of terminal 1000. A succession of frames of image data that can be captured and subject to the described processing can also be "windowed frames" comprising pixel values corresponding to less than a full frame of pixels of image sensor array 1033. A succession of frames of image data that can be captured and subject to the described processing can also comprise a combination of full frames and windowed frames. A full frame can be captured by selectively addressing for read out pixels of image sensor 1032 having image sensor array 1033 corresponding to the full frame. A windowed frame can be captured by selectively addressing for read out pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and relevant for capture of a windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of terminal 1000 can be increased (and frame time decreased) by decreasing of a frame picture size.

Figure 6:
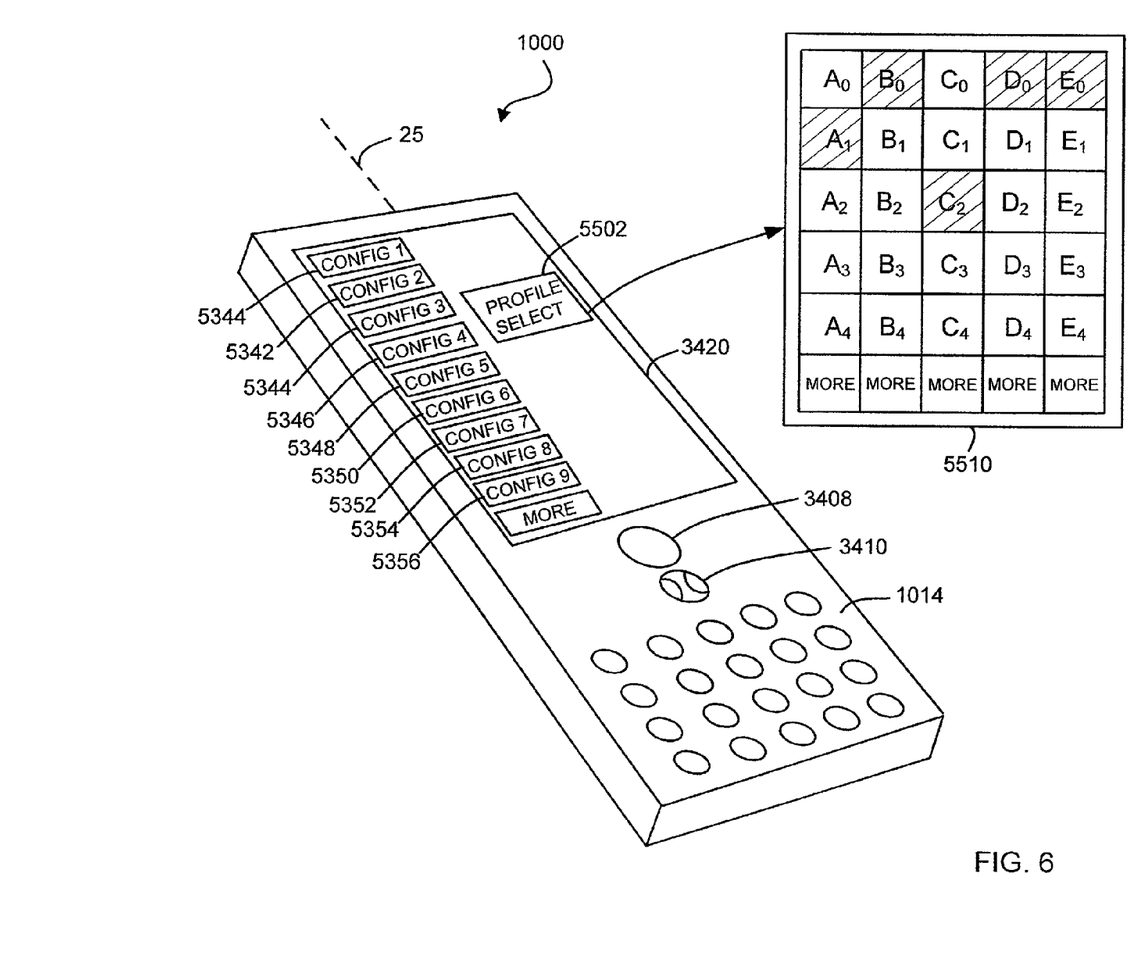
FIG. 6 is a perspective view of an image sensor based indicia reading terminal illustrating a user interface thereof in one embodiment.

A physical form view of terminal 1000 in one embodiment is shown in FIG. 6. Display 3420, trigger 3408, and pointer mechanism 3410 can be disposed on a common side of a hand held housing 1014 as shown in FIG. 6. Display 3420 and pointer mechanism 3410 in combination can be regarded as a user interface of terminal 1000. A user interface of terminal 1000 can also be provided by configuring terminal 1000 to be operative to be reprogrammed by decoding of programming bar code symbols. A hand held housing 1014 for terminal 1000 can in another embodiment be devoid of a display and can be in a gun style form factor.

Referring to terminal 1000, terminal 1000 can be operative to move a lens setting of lens assembly 200 between at least a first plane of optimum focus setting (best focus distance setting) and a second plane of optimum focus setting. Indicia reading terminal 1000 can be operative to move a lens setting of the lens assembly between at least first and second different planes of optimum focus settings, and can further be operative to expose a first frame of image data with the lens assembly at the first plane of optimum focus setting and a second frame of image data with the lens assembly at the second plane of optimum focus setting, and the terminal can further be configured so that the terminal is operative to subject each of the first and second frames of image data to a decode attempt for decoding of a decodable indicia. The second frame can be a successive frame in relation to the first frame or a non-successive subsequent frame in relation to the first frame. Also, the first and second frames of image data can be exposed, read out, captured, and processed during a common operator activated read attempt, or alternatively, separate operator activated read attempts.

Terminal 1000 can be operative so that terminal 1000, when an operator activated read attempt is activated by actuation of trigger 3408, can capture a succession of frames and subject one or more of the frames to a decode attempt until a time that the operator activated read attempt is deactivated, e.g., by release of trigger 3408 or a successful decode or a timeout condition being satisfied. In another aspect, terminal 1000 according to a first functionality set forth herein can be operative to move a lens setting of the lens assembly between at least the first and the second lens settings of the lens assembly during a time that the terminal executes an operator activated read attempt of the terminal.

Terminal 1000 according to a second functionality set forth herein can be operative to maintain a lens setting of the terminal at a certain lens setting during a time that the terminal executes an operator activated read attempt of the terminal. In addition, terminal 1000 can be operative to move a lens setting in accordance with an operator input command input subsequent to a first operator activated read attempt and prior to a second operator activated read attempt. Terminal 1000 can be further operative so that a first frame and a second frame utilized for a decode attempt are frames exposed during separate first and second separate operator activated read attempts of the terminal.

Figure 7:
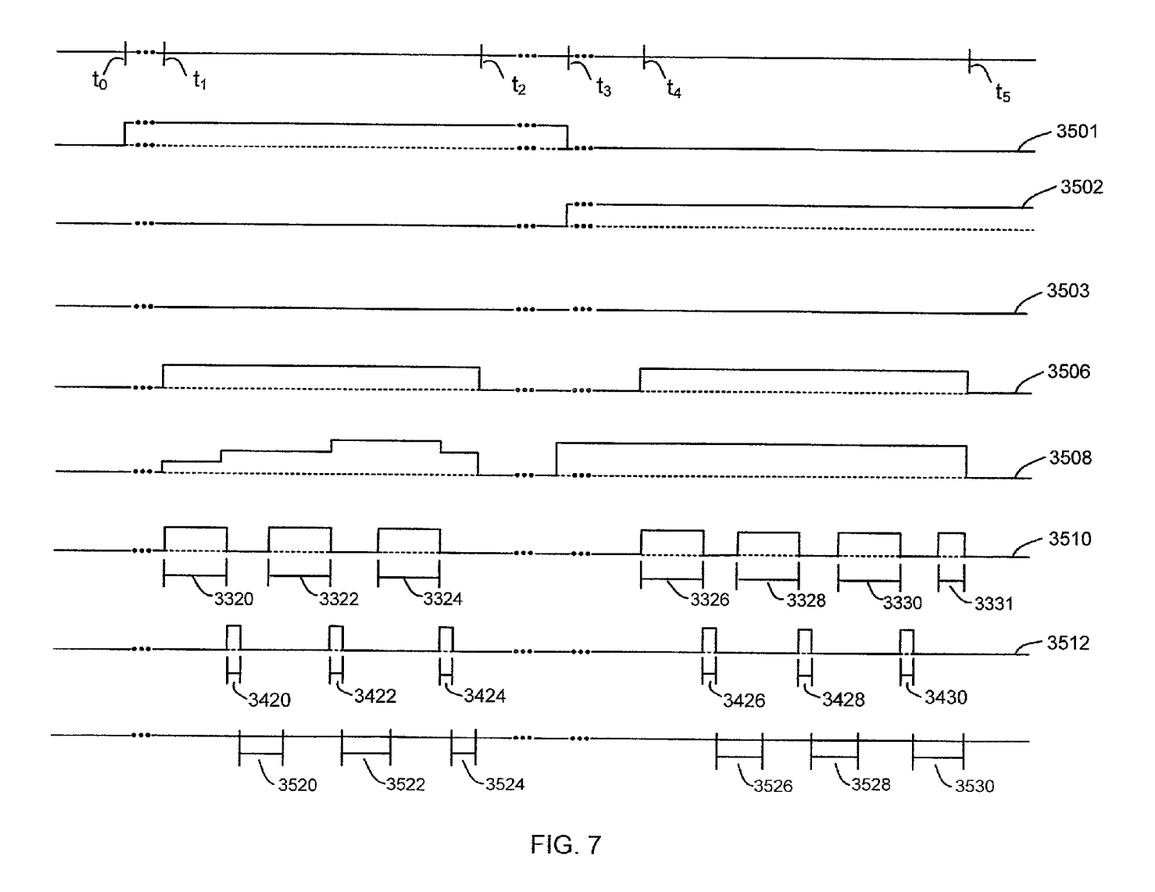
FIG. 7 is a timing diagram illustrating timing between various functions of an image sensor based indicia reading terminal in one embodiment.

A timing diagram further illustrating operation of terminal 1000 in one embodiment is shown in FIG. 7. The timing diagram of FIG. 7 illustrates terminal 1000 undergoing a change in configuration from a first configuration having the described functionality in which a lens setting of variable lens assembly 200 of terminal 1000 is varied during a read attempt to a second configuration of the second described functionality in which a variable lens assembly 200 of terminal 1000 remains at a fixed setting throughout a read attempt, to a third configuration also of the second described functionality in which variable lens assembly 200 of terminal 1000 remains at a fixed lens setting throughout an operator activated read attempt.

Referring to the timing diagram of FIG. 7, signal 3501 is a state signal representing an active or inactive state of an operator selectable configuration in accordance with the first described functionality (lens setting changes during an operator activated read attempt). Signal 3502 is a state signal representing the state of an operator selectable configuration (lens setting remains unchanged during an operator activated read attempt). Signal 3503 is a state signal representing the state of another operator selectable configuration of the second described functionality (lens setting remains unchanged). Signal 3506 is a trigger signal which can be made active by actuation of trigger 3408, and which can be deactivated by releasing of trigger 3408 which may become inactive after a time out period or after a successful decode of a decodable indicia. Signal 3508 represents an energy input level input into lens assembly 200 of terminal 1000. Signal 3510 is an exposure signal. Logic high periods of signal 3510 define exposure periods 3320, 3322, 3324, 3326, 3328, 3330, and 3331. Signal 3512 is a read out signal. Logic high periods of signal 3512 define read out periods 3420, 3422, 3424, 3426, 3428, 3430.

Referring to processing periods 3520, 3522, 3524, 3526, 3528, and 3530, the noted processing periods can represent processing periods during which time CPU 1060 of terminal 1000 processes stored (e.g., buffered) frames representing a substrate that can bear decodable indicia. Such processing can include processing for attempting to decode a decodable indicia as described herein.

With further reference to the timing diagram of FIG. 7, an operator at time, $t_0$, can select a first configuration using e.g., button 5356 to be described with reference to FIG. 6 so that terminal 1000 is set in a configuration in which a lens setting of lens assembly 200 will vary during a read attempt. At time $t_1$, an operator can activate trigger signal 3506. In response to trigger signal 3506 being activated, terminal 1000 can expose during exposure periods 3320, 3322, 3324 a plurality of frames of image data.

Referring to the timing diagram of FIG. 7, the energy input level input for establishing a setting of lens assembly 200 as represented by signal 3508 may be at different levels during each of respective exposure periods 3320, 3322, 3324 when terminal 1000 operates in the first configuration described with reference to the timing diagram of FIG. 7. At time $t_2$, trigger signal 3506 can be deactivated e.g., by successful decode, a timeout condition being satisfied, or a release of trigger 3408. At time $t_3$, an operator can activate a configuration in accordance with the second functionality as described herein e.g., by actuation of button 5344. Terminal 1000 can be operative so that activation of a subsequent configuration deactivates a previous configuration.

Referring to signal 3508, signal 3508 can be established at an energy level corresponding to the selected lens setting. In one embodiment, a selection of a configuration in which the second described functionality is active can be regarded as a selected lens setting. Referring to the timing diagram of FIG. 7, selection of button 5344 establishes a fixed lens setting at a far plane of optimum focus distance for a next read attempt. At time $t_4$, a trigger signal 3506 can be activated again, e.g., by an operator actuation of trigger 3408. A plurality of exposure periods can ensue as seen by exposure periods 3326, 3328, 3330, 3331. When operating in a configuration according to the second described functionality, an energization input level reprogrammed by reading of programming bar code symbols, and a user interface can be regarded as being provided by the providing of terminal 1000 to be reprogrammed by reading of programming bar code symbols.

Various configurations of terminal 1000 are summarized in Table A. Table A summarizes operation of terminal 1000 in accordance with various configurations including those summarized in connection with FIG. 7. The "first" configuration corresponding to state signal 3501 described with reference to the timing diagram of FIG. 7 corresponds to Configuration 9 summarized in Table A and selectable with use of button 5356 as shown in FIG. 6. The "second" configuration corresponding to state signal 3502, described with reference to the timing diagram of FIG. 7 corresponds to Configuration 1 summarized in Table A (lens setting remains at a far plane of optimum focus setting through read attempts) and which is selectable with use of button 5344 as shown in FIG. 6. Configurations 5, 6, 7, 8, and 9 are configurations in accordance with the first type of functionality (changing lens setting, lens setting changing during read attempts) configuration while Configurations 1, 2, 3, and 4 are configurations in accordance with the second type of functionality (unchanging lens setting). From terminal design to terminal design, the distances designated as far, intermediate, near, and near contact can vary and the terminal can be operative so that a theoretically infinite number of best focus distance lens settings intermediate of those specified are possible. Exemplary ones of such values are: far 762.00 cm (300"), intermediate 91.40 cm (36"), near 20.32 cm (8"), near contact 7.62 cm (3").

TABLE A

| CONFIGURATION | FRAME 1 | FRAME 2 | FRAME 3 | FRAME 4 | FRAME 5 | FRAME 6 | FRAME 7 | FRAME 8 | FRAME 9 | FRAME 10 |
|---|---|---|---|---|---|---|---|---|---|---|
| 1 | SETTING: FAR | SETTING: FAR | SETTING: FAR | SETTING: FAR | SETTING: FAR | SETTING: FAR | SETTING: FAR | SETTING: FAR | SETTING: FAR | ... |
| 2 | SETTING: INTERMEDIATE | SETTING: INTERMEDIATE | SETTING: INTERMEDIATE | SETTING: INTERMEDIATE | SETTING: INTERMEDIATE | SETTING: INTERMEDIATE | SETTING: INTERMEDIATE | SETTING: INTERMEDIATE | SETTING: INTERMEDIATE | ... |
| 3 | SETTING: NEAR | SETTING: NEAR | SETTING: NEAR | SETTING: NEAR | SETTING: NEAR | SETTING: NEAR | SETTING: NEAR | SETTING: NEAR | SETTING: NEAR | ... |
| 4 | SETTING: NEAR CONTACT | SETTING: NEAR CONTACT | SETTING: NEAR CONTACT | SETTING: NEAR CONTACT | SETTING: NEAR CONTACT | SETTING: NEAR CONTACT | SETTING: NEAR CONTACT | SETTING: NEAR CONTACT | SETTING: NEAR CONTACT | |
| 5 | SETTING: NEAR CONTACT | SETTING: NEAR | SETTING: INTERMEDIATE | SETTING: FAR | SETTING: INTERMEDIATE | SETTING: INTERMEDIATE | SETTING: INTERMEDIATE | SETTING: INTERMEDIATE | SETTING: INTERMEDIATE | ... |
| 6 | SETTING: NEAR CONTACT | SETTING: NEAR | SETTING: INTERMEDIATE | SETTING: FAR | SETTING: INTERMEDIATE | SETTING: NEAR | SETTING: NEAR CONTACT | SETTING: NEAR | SETTING: INTERMEDIATE | ... |
| 7 | SETTING: NEAR CONTACT | SETTING: NEAR | SETTING: INTERMEDIATE | SETTING: FAR | SETTING: NEAR CONTACT | SETTING: NEAR | SETTING: INTERMEDIATE | SETTING: FAR | SETTING: NEAR CONTACT | ... |
| 8 | SETTING: INTERMEDIATE | SETTING: FAR | SETTING: INTERMEDIATE | SETTING: NEAR | SETTING: NEAR CONTACT | SETTING: NEAR | SETTING: INTERMEDIATE | SETTING: FAR | SETTING: INTERMEDIATE | ... |
| 9 | SETTING: NEAR | SETTING: INTERMEDIATE | SETTING: FAR | SETTING: INTERMEDIATE | SETTING: NEAR | SETTING: INTERMEDIATE | SETTING: FAR | SETTING: INTERMEDIATE | SETTING: NEAR | ... | into lens assembly 200 as seen by signal 3508 and therefore a setting of lens assembly 200 can remain constant. At time $t_5$, trigger signal 3506 can be deactivated e.g., by a release of trigger 3408, by expiration of a timeout or by a successful decode of a message.

Mode, configuration, or setting selections described herein described as being made with use of a user (operator) interface comprising a display and pointer mechanism of terminal 1000 or terminal 1000 can also be made with use of another user interface, e.g., terminal 1000 can be operative to be Referring now to Table B, various association profiles of terminal 1000 are shown and described. With reference to Table B, terminal 1000 can be operative to have a profile of the set of profiles A*B*C*D*E* where "*" is a wild card designator designating any one of the subscripts associated with the character as shown in Table B. Terminal 1000 can be operative to always operate in a single profile of the set of profiles A*B*C*D*E* or else can be operative so that a particular active profile among a set of possible candidate profiles is operator selectable. Candidate profiles of the set of profiles A*B*C*D*E* can comprise a plurality of sub-profiles. A selected profile can include a selected sub-profile of each of several categories. In the described example, selection of a sub-profile in the A* category establishes a particular association (or lack of association) between a lens setting and a picture size. Selection of a particular profile in the B* sub-profile category establishes a particular association (or lack of association) between a lens setting and an exposure level. Selection of a particular profile in the C* sub-profile category establishes a particular association (or lack of association) between a lens setting and an amplifier gain control, i.e., the gain of amplifier 1036, that can amplify image signals. As indicated by the D* sub-profiles and E* sub-profiles, terminal 1000 can be operative so that a lens setting of lens assembly 200 can be linked to one or more controls of additional or alternative categories.

For allowing operator selection of a profile, terminal 1000 can be operative to have a selector feature as is described with reference to button 5502 of FIG. 6. Terminal 1000 can be operative so that by selection of button 5502, terminal 1000 can display profile selector window 5510. An operator can select a particular profile of the profile set A*B*C*D*E* by the selection of appropriate matrix buttons of window 5510. A highlighting of a particular button indicates an active state. In the particular operating state indicated to be active in FIG. 6, the profile $A_1B_0C_2D_0E_0$ happens to be active as indicated by the highlighted buttons of window 5510.

As seen from Table B, selection of a certain sub-profile associates a particular control (e.g., an operational parameter, a process for determining an operational parameter, an algorithm for determining an operational parameter) to a particular lens setting so that in operation of terminal 1000, the particular control is active when the particular lens setting is active. If a particular picture size is associated to a particular lens setting, a frame having particularly specified window coordinates (defining a boundary for a windowed frame to be read out) can be addressed for read out when there is a read out of a frame with the lens setting active. If a particular process for determining an operational parameter is associated to a particular lens setting, the particular process for determining an operational parameter will be active when there is being determined an operative parameter for a scan having the associated lens setting. If a particular exposure period is associated to a particular lens setting, the terminal will control the exposure period to the particular level when there is association with the particular lens setting. If a particular gain is associated to a particular lens setting, the terminal can control the gain to the associated level when applying gain to frame image signals of a frame exposed with that particular lens setting active. In the examples of Table B, a window position is specified in terms of outer boundary coordinates. It will be understood that other formulas can be utilized for specified window positions (e.g., a window dimension in combination with an offset).

TABLE B

| Assoc. Profile | FAR | INTERMEDIATE | NEAR | NEAR CONTACT | COMMENTS |
|---|---|---|---|---|---|
| A0 | Picture Size: Full Frame: | Picture Size: Full Frame: | Picture Size: Full Frame: | Picture Size: Full Frame: | Picture size is unchanged and set to a full frame picture size irrespective of lens setting. |
| A1 | Picture Size: Window Coordinates (1, 240; 752, 240; 1, 241; 752, 241) | Picture Size: Window Coordinates (200, 200; 552, 200; 200, 280; 552, 280) | Picture Size: Window Coordinates (100, 100; 652, 100; 100, 380; 652, 380) | Picture Size: Window Coordinates (1, 1; 752, 1; 1, 480; 752, 480) (full frame) | Picture size is increased for closer plane of optimum focus (best focus distance) lens settings. |
| A2 | Picture Size: Window Coordinates (1, 240; 752, 240; 1, 241; 752, 241) | Picture Size: Window Coordinates (1, 240; 752, 240; 1, 241; 752, 241) | Picture Size: Window Coordinates (1, 240; 752, 240; 1, 241; 752, 241) | Picture Size: Window Coordinates (1, 240; 752, 240; 1, 241; 752, 241) | Picture size remains at a setting corresponding to a specific window position and picture size less than a full frame picture size irrespective of lens setting. |
| B0 | Exposure: $E = E_B$ | Exposure: $E = E_B$ | Exposure: $E = E_B$ | Exposure: $E = E_B$ | Exposure level remains constant irrespective of lens setting. |
| B1 | Exposure: $E = E_F, E_F > E_B$ | Exposure: $E = E_B$ | Exposure: $E = E_N, E_N < E_B$ | Exposure: $E = E_{NC}, E_{NC} < E_N$ | Exposure increases with longer best focus distance lens settings. |
| B2 | Exposure: $E_o = E_F, E_F > E_B$ $E_i = f_{E1}(E_{i-1}, W_{i-1})$ | Exposure: $E_o = E_B$ $E_i = f_{E1}(E_{i-1}, W_{i-1})$ | Exposure: $E_o = E_N$, $E_N < E_B$ $E_i = f_{E1}(E_{i-1}, W_{i-1})$ | Exposure: $E_o = E_{NC}$, $E_{NC} < E_N$ $E_i = f_{E1}(E_{i-1}), W_{i-1})$ | Each lens setting has a specific exposure control process. |
| B3 | Exposure: $E_o = E_F, E_F > E_B$ $E_i = f_{E1}(E_{i-1}, W_{i-1})$ | Exposure: $E_o = E_B$ $E_i = f_{E2}(E_{i-1}, W_{i-1})$ | Exposure: $E_o = E_N$, $E_N < E_B$ $E_i = f_{E3}(E_{i-1}, W_{i-1})$ | Exposure: $E_o = E_{NC}$, $E_{NC} < E_N$ $E_i = f_{E4}(W_{i-1})$ | Each lens setting has an associated specific exposure control process and algorithm. |
| C0 | AMPLIFIER GAIN: $G = G_B$ | AMPLIFIER GAIN: $G = G_B$ | AMPLIFIER GAIN: $G = G_B$ | AMPLIFIER GAIN: $G = G_B$ | Gain unchanged regardless of lens settings. |
| C1 | AMPLIFIER GAIN: $G = G_F$, $G_F > G_B$ | AMPLIFIER GAIN: $G = G_B$ | AMPLIFIER GAIN: $G = G_N$, $G_N < G_B$ | AMPLIFIER GAIN: $G = G_{NC}$, $G_{NC} < G_N$ | Gain is decreased for nearer best focus distance lens settings. |
| C2 | AMPLIFIER GAIN: $G_o = G_F$, $G_F > G_B$ $G_i = f_{G1}(G_{i-1}, W_{i-1})$ | AMPLIFIER GAIN: $G_o = G_B$, $G_i = f_{G1}(G_{i-1}, W_{i-1})$ | AMPLIFIER GAIN: $G_o = G_N$, $G_N < G_B$ $G_i = f_{G1}(G_{i-1}, W_{i-1})$ | AMPLIFIER GAIN: $G_o = G_{NC}$, $G_{NC} < G_N$ $G_i = f_{G1}(G_{i-1}, W_{i-1})$ | Each lens setting has an associated specific gain control process. |
| C3 | AMPLIFIER GAIN: $G_o = G_F$, $G_F > G_B$ $G_i = f_{G1}(G_{i-1}, W_{i-1})$ | AMPLIFIER GAIN: $G_o = G_B$, $G_i = f_{G2}(G_{i-1}, W_{i-1})$ | AMPLIFIER GAIN: $G_o = G_N$, $G_N < G_B$ $G_i = f_{G3}(G_{i-1}, W_{i-1})$ | AMPLIFIER GAIN: $G_o = G_{NC}$, $G_{NC} < G_N$ $G_i = f_{G4}(W_{i-1})$ | Each lens setting has an associated specific gain control process and algorithm. |

Additional features are now described with reference to particular sub-profiles that can be selected by an operator. Referring to sub-profile $A_1$, with sub-profile $A_1$ active, a picture size (expressed in terms of window coordinates defining a boundary for a windowed frame to be read out (according to the described formatting, pixels within the boundary can be subject to readout, and readout can be avoided for pixels outside the boundary) is associated with and automatically varies with a lens setting. In general, as seen with reference to sub-profile $A_1$, picture size in terms of number of pixels subject to read out is increased when a lens setting of lens assembly 200 includes a nearer plane of optimum focus and is reduced when a lens setting of lens assembly 200 is at a longer plane of optimum focus. The availability of sub-profile $A_2$ is in recognition of the fact that at longer reading distances, a smaller picture size will be sufficient to encompass a complete representation of a decodable indicia such as a bar code. By contrast, referring to sub-profile $A_0$, with sub-profile $A_0$ active a picture size of terminal 1000 remains at a constant size (a full frame) irrespective of the lens setting of the terminal. With sub-profile $A_2$ active, the picture size which remains constant (at a full frame setting) irrespective of the lens setting can be regarded as being disassociated with the lens setting. With sub-profile $A_2$ active, the picture size also remains constant, but at a constant setting that defines a specific windowed frame position.

Turning now to sub-profiles $B_0$, $B_1$, $B_2$, and $B_3$, the sub-profiles $B_0$, $B_1$, $B_2$, and $B_3$ relate to the control of an exposure level (exposure period) of terminal 1000. In the development of terminal 1000, it was determined that it might be useful in some applications to vary a control of exposure with the present lens setting.

Referring to sub-profile $B_1$, a longer exposure period for a terminal can be utilized at a farther plane of optimum focus lens settings irrespective of the actual terminal to target distance and shorter exposure periods can be applied at shorter plane of optimum focus lens settings irrespective of the actual terminal to target distance. Thus, with longer plane of optimum focus lens settings, longer exposure periods can be utilized for optimization of performance of terminal at terminal to target distances corresponding to the current lens setting. By contrast, referring to sub-profile $B_0$, with sub-profile $B_0$ active, an exposure period applied to image sensor 1032 is constant at a baseline level $E=E_B$ irrespective of an active lens setting.

Referring to sub-profiles $B_2$ and $B_3$, with sub-profile $B_2$ active, exposure period parameters applied to image sensor 1032 of the terminal 1000 are not constant but rather are determined according to an algorithm. With sub-profile $B_2$ active, an applied exposure period value can have an initial value, $E_0$ established at a predetermined level with subsequent values $E_i$, (the value for each frame after the initial frame) determined on a frame by frame basis. As seen from Table B, an initial exposure period, $E_0$, which can refer to the exposure period for a frame during a certain operator activated read attempt can vary depending on the lens setting. That is, referring to sub-profile $B_2$, an initial applied exposure period parameter value at the far lens setting is $E_0=E_F$, at the immediate lens setting, $E_0=E_B$, at the near lens setting $E_0=E_N$ and at the near contact setting $E_0=E_{NC}$, as is indicated in Table B.

Referring to subsequent exposure periods for subsequent frames after an initial frame, the subsequent exposure periods can be determined according to function $f_1$. Referring to function $f_{E1}$, function $f_{E1}$ is a function of the applied exposure period, $E=E_{i-1}$, for the most recent frame and the white level, $W_{i-1}$, for the most recent frame available for processing by CPU 1060. A white level for a frame may be calculated as an average of pixel values at pixel positions of a frame of image data. In one embodiment, an exposure parameter value, E, for a next frame may be determined by increasing the applied exposure, applied during the most recent exposure period by a predetermined amount if $W_{i-1}$ is below a target value, and decreasing that amount by a predetermined amount if the parameter $W_{i-1}$ is above a predetermined target value. In one embodiment, with reference to sub-profile $B_2$, the most recent frame for purposes of determining an exposure period for a next frame may not be regarded as the most recent overall frame available for processing associated with the present operator activated read attempt, but rather the most recent frame exposed with the present lens setting active during the present operator activated read attempt. Otherwise, the most recently applied parameter value (e.g., exposure value) may not be the overall most recently applied parameter value during a present read attempt, but rather the most recently applied parameter value with the present lens setting active during the present read attempt. Thus referring to Configuration 6 in Table A, the most recent frame relative to frame 9 for purposes of calculation of an exposure period may not be regarded as being frame 8, but rather frame 5, the most recent frame available for processing with the present lens setting active. Also, the most recently applied gain parameter value may be regarded as not being the gain applied for frame 8, but rather for frame 5. It is seen, therefore, that terminal 1000 can be operative when determining an operator parameter for a certain frame having an associated certain lens setting can preferentially utilize frames having the same lens setting. In one example of such preferential utilization as set forth herein in the described example, terminal 1000 can discard (ignore) data of frames having associated lens settings that are different from the certain lens setting. Referring still to the example of sub-profile $B_2$, the same algorithm expressed as the function $f=f_{E1}$ may be active for determination of an applied exposure period irrespective of the current lens setting. However, the applied exposure at each lens setting may be quite different, first, because the initial exposure period, $E_0$ is different for each lens setting with sub-profile $B_2$ active, and second because different processes may be active for determining a subsequently applied i.e., after an initial frame exposure parameter for each particular lens setting.

Different programs may be run by CPU 1060 for determination of an energization level to apply to a light emitting light source with each respective lens setting active. Terminal 1000 can be operative so that CPU 1060 executes a different processing thread for each exposure period determination process it is currently executing.

Referring now to sub-profile $B_3$, sub-profile $B_3$ is similar to sub-profile $B_2$ except that in addition to running different exposure parameter determination processes for each respective lens setting, the algorithms by which the processes are run are differentiated between various lens settings. Referring to the example of sub-profile $B_3$, the active algorithm with the first lens setting active is expressed by the function $f=f_{E1}$. The active algorithm with the intermediate lens setting active is expressed by the function $f=f_{E2}$, the active algorithm corresponding to the near optimum focus distance lens setting is expressed by the function $f=f_{E3}$ and the active algorithm corresponding to the near plane of optimum focus setting is expressed by the function $f=f_{E4}$, where $f_{E4}$ depends only on a white level of a most recent frame but not on an applied exposure period of a most recent frame available for processing associated to the present operator activated read attempt. In such an embodiment, an exposure period parameter can be determined by looking up a value from a lookup table, rather than incrementing or decrementing a recently applied value.

Turning now to sub-profiles $C_0$, $C_1$, $C_2$, and $C_3$, the sub-profiles $C_0$, $C_1$, $C_2$, and $C_3$ relate to the control of an amplifier gain for input to amplifier 1036 for amplification of frame image signals. In the development of terminal 1000, it was determined that it might be useful in some applications to vary a control of an amplifier gain with the current lens setting.

Referring to sub-profile $C_1$, a higher gain level for a terminal amplifier gain can be applied at farther lens settings irrespective of the actual terminal to target distance and lower gain levels can be applied at shorter plane of optimum focus lens settings irrespective of the actual terminal to target distance. Thus, with farther plane of optimum focus lens settings there can be applied additional amplification of frame image signals. By contrast, referring to sub-profile $C_0$, with sub-profile $C_0$ active, gain applied to frame image signals is constant at the baseline level $G=G_B$ for each possible lens setting. When sub-profile $C_0$ is active, the amplifier gain (since it remains the same irrespective of lens settings), can be regarded as being disassociated from the lens setting.

Referring to sub-profiles $C_2$ and $C_3$, with sub-profile $C_2$ active, the gain applied is determined according to an algorithm. With sub-profile $C_2$ active, terminal 1000 can have an initial value $G_0$ and subsequent values $G_i$ (the gain for each subsequent set of frame image signals) determined on a frame by frame basis. As seen from Table B, the initial applied gain value $G_0$ can vary depending on the lens setting. That is, referring to sub-profile $C_2$, an initial applied gain level at the far lens setting is $G_0=G_F$, at the immediate lens setting, $G_0=G_B$, at the near lens setting $G_0=G_N$ and at the near contact setting $G_0=G_{NC}$ as is indicated in Table B. Referring to subsequent gain levels for subsequent scans after an initial frame, the subsequent gain levels can be determined according to function $f_{G1}$. Referring to function $f_{G1}$, function $f_{G1}$, is a function of the applied gain level for the previous scan $G=G_{i-1}$ and the white level, the white level of the most recent frame available for proofing by CPU 1060. In one embodiment, with reference to sub-profile $C_2$, the most recent frame may not be regarded as the most recent overall frame captured during a present operator activated read attempt, but rather the most recent frame captured during the present operator activated read attempt with the present lens setting active. Thus referring to configuration 6 in Table A, the most recent frame relative to frame 9 for purposes of calculation of a gain level may be regarded not as being frame 8, but rather frame 5, the most recent scan with the present lens setting active. Similarly, the most recently applied gain $G=G_{i-1}$ may be regarded not as the overall most recently applied gain, but the most recently applied gain with the present lens setting active. Thus, in the example of Configuration 6, the gain of frame 6, not frame 8, can be regarded as the most recently applied gain. Referring still to the example of sub-profile $C_2$, the same algorithm expressed as the function $f=f_{G1}$ may be active for determination of an applied gain irrespective of the current lens setting. However, the applied gain at each lens setting may be quite different, first, because the initial energization level, $G_0$ is different for each lens setting with sub-profile $C_2$ active, and second because difference processes may be active for determining a subsequently applied i.e., after an initial gain level for each particular lens setting.

Different programs may be run by CPU 1060 for determination of a gain level to apply to a light emitting light source with each respective lens setting active. Terminal 1000 can be operative so that CPU 1060 executes a different processing thread for each gain level determination process it is currently executing.

Referring now to sub-profile $C_3$, sub-profile $C_3$ is similar to sub-profile $C_2$ except that in addition to running different gain determination processes for each respective lens setting, the algorithms by which the processes are run are differentiated between various lens settings. The gain determination algorithms active with the far lens setting active can be $f=f_{G1}$. The active algorithm with the intermediate lens setting active can be expressed by the function $f=f_{G2}$. The gain determination algorithm corresponding to the near optimum focus distance lens setting can be expressed by the function $f=f_{G3}$ and the algorithm active corresponding to the near contact optimum focus setting if the function $f=f_{G4}$ where $f_{G4}$ depends only on a white level of a most recent frame but not on a most recently applied gain. In such an embodiment, a gain for a present frame can be determined by reference to a lookup table without reference to a previously applied gain.

A small sample of systems methods and apparatus that are described herein is as follows:

A1. An indicia reading terminal comprising:

an image sensor including an image sensor array having a plurality of pixels;

a variable setting lens assembly for focusing light on the image sensor array, the variable setting lens assembly having a first lens setting at which the terminal has a first plane of optimum focus and a second lens setting at which the terminal has a second plane of optimum focus;

wherein the indicia reading terminal is operative to expose a first frame with the lens assembly at the first lens setting and is further operative to expose a second frame with the lens assembly at the second lens setting;

wherein the indicia reading terminal is further operative to attempt to decode a decodable indicia by processing at least one of the first frame and second frame;

wherein the indicia reading terminal is further operative so that there is associated with the first lens setting a first picture size and further so that there is associated with the second lens setting a second picture size so that a frame exposed with the lens assembly at the first lens setting has a first picture size and further so that a frame exposed with the lens assembly at the second lens setting has a second picture size.

A2. The indicia reading terminal as set forth in claim A1, wherein the indicia reading terminal is operative so that the first frame and the second frame are exposed during a single read attempt activated by an operator.

A3. The indicia reading terminal as set forth in claim A1, wherein the indicia reading terminal is operative so that the terminal changes a lens setting of the lens assembly between the first lens setting and the second lens setting on an open loop basis irrespective of a sensed condition.

A4. The indicia reading terminal as set forth in claim A1, wherein the indicia reading terminal is operative so that the terminal changes a lens setting of the lens assembly between the first lens setting and the second lens setting responsively to sensed terminal to target distance.

A5. The indicia reading terminal as set forth in claim A1, wherein the terminal is further operative to expose a third frame with the lens assembly at a third lens setting, and wherein there is associated with the third lens setting a third picture size.

A6. The indicia reading terminal as set forth in claim A1, wherein there is associated with the first and second lens settings at least one control in addition to picture size, the additional control being an operational parameter.

A7. The indicia reading terminal as set forth in claim A1, wherein there is associated with the first and second lens settings at least one control in addition to picture size, the additional control being an operational parameter selected from the group consisting of an exposure parameter, and an amplifier gain parameter.

A8. The indicia reading terminal as set forth in claim A1, where the exposure parameter is an initial exposure, and wherein the amplifier gain parameter is an initial gain parameter.

A9. The indicia reading terminal as set forth in claim A1, wherein there is associated with the first and second lens settings at least one control in addition to picture size, the additional control being a process selected from the group consisting of an exposure parameter determination process and a gain determination process.

B1. An indicia reading terminal comprising:
an image sensor including an image sensor array having a plurality of pixels;
a variable setting lens assembly for focusing light on the image sensor array, the variable setting lens assembly having a first lens setting at which the terminal has a first plane of optimum focus and a second lens setting at which the terminal has a second plane of optimum focus;
wherein the indicia reading terminal is operative to expose a first frame with the lens assembly at the first lens setting and is further operative to expose a second frame with the lens assembly at the second lens setting;
wherein the indicia reading terminal is further operative to attempt to decode a decodable indicia by processing at least one of the first frame and second frame;
wherein there is associated with the first lens setting a first at least one control, and wherein there is associated with the second lens setting a second at least one control, the first at least one control selected from the group consisting of an operational parameter and a process for determining an operational parameter, the second at least one control selected from the group consisting of an operational parameter and a process for determining an operational parameter.

B2. The indicia reading terminal as set forth in claim B1, wherein the first and second at least one control includes a picture size.

B3. The indicia reading terminal as set forth in claim B1, wherein the first and second at least one control includes an initial exposure period.

B4. The indicia reading terminal as set forth in claim B1, wherein the first and second at least one control includes a process for determining amplifier gain.

B5. The indicia reading terminal as set forth in claim B1, wherein the first and second at least one control includes a picture size operational parameter coupled with an additional control.

B6. The indicia reading terminal as set forth in claim B1, wherein the first and second at least one control includes a control for controlling picture size.

C1. An indicia reading terminal comprising:
an image sensor including an image sensor array having a plurality of pixels;
a variable setting lens assembly for focusing light on the image sensor array, the variable setting lens assembly having a first lens setting at which the terminal has a first plane of optimum focus and a second lens setting at which the terminal has a second plane of optimum focus;
wherein the indicia reading terminal is operative in a first operator selectable operating state and a second operator selectable operating state;
wherein the indicia reading terminal during an operator initiated read attempt in the first operator selectable operating state is operative to vary the lens setting of the lens assembly between a first lens setting and a second lens setting, wherein the indicia reading terminal is further operative in the first operator selectable operating state so that frames exposed with the lens assembly at the first lens setting have a first picture size and further so that frames exposed with the lens assembly at the second lens setting have a second picture size different from the first picture size;
wherein the indicia reading terminal during an operator initiated read attempt in the second operator selectable operating state is operative to vary the lens setting of the lens assembly between a first lens setting and a second lens setting, wherein the indicia reading terminal is further operative in the second operator selectable operating state so that frames exposed with the lens assembly at the first lens setting and frames exposed with the lens assembly at the second lens setting have a common picture size.

D1. An indicia reading terminal comprising:
an image sensor including an image sensor array having a plurality of pixels;
a variable setting lens assembly for focusing light on the image sensor array, the variable setting lens assembly having a first lens setting at which the terminal has a first plane of optimum focus and a second lens setting at which the terminal has a second plane of optimum focus;
wherein the indicia reading terminal is operative to expose a first frame with the lens assembly at the first lens setting and is further operative to expose a second frame with the lens assembly at the second lens setting;
wherein the indicia reading terminal is further operative to attempt to decode a decodable indicia by processing at least one of the first frame and second frame;
wherein the indicia reading terminal is operative so that during an operator initiated read attempt the terminal exposes a first plurality of frames with the lens assembly at the first lens setting and a second plurality of frames with the lens assembly at the second lens setting, wherein the terminal is further operative so that during the operator initiated read attempt the terminal switches a lens setting of the lens assembly from the first lens setting to the second lens setting and back to the first lens setting so that there are exposed a plurality of frames with an alternating pattern of lens setting associations;
wherein the indicia reading terminal is further operative so that when executing a process for determining an operational parameter to be applied for a next frame with the lens setting at the first lens setting, the terminal preferentially utilizes a prior frame having as an associated lens setting the first lens setting.

D2. The indicia reading terminal as set forth in claim D1, wherein the terminal when preferentially utilizing a prior frame having an associated lens setting the terminal discards a prior frame having as an associated lens setting the second lens setting.

D3. The indicia reading terminal as set forth in claim D1, wherein the process for determining an operational parameter is a process for determining an amplifier gain for the next frame.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. An indicia reading terminal comprising:
an image sensor including an image sensor array having a plurality of pixels;
a variable setting lens assembly for focusing light on the image sensor array, the variable setting lens assembly having a first lens setting at which the terminal has a first plane of optimum focus and a second lens setting at which the terminal has a second plane of optimum focus, the second plane of optimum focus being farther than the first plane of optimum focus;
wherein the indicia reading terminal is operative to expose a first frame with the lens assembly at the first lens setting and is further operative to expose a second frame with the lens assembly at the second lens setting and is further operative to expose a third frame with the lens assembly at the first lens setting, the indicia reading terminal being operative to expose the second frame subsequently to exposing the first frame, the indicia reading terminal being operative to expose the third frame subsequently to exposing the second frame;
wherein the indicia reading terminal is further operative to attempt to decode a decodable indicia by processing each of the first frame the second frame and the third frame;
wherein the indicia reading terminal is further operative so that there is associated with the first lens setting a first picture size and further so that there is associated with the second lens setting a second picture size so that a frame exposed with the lens assembly at the first lens setting has a first picture size and further so that a frame exposed with the lens assembly at the second lens setting has a second picture size, wherein the first picture size is larger than the second picture size, wherein the first frame and the third frame have pixel values corresponding to a first set of pixels of the image sensor array, wherein the second frame has pixel values corresponding to a second set of pixels of the image sensor array, the first set of pixels including the pixels of the second set of pixels, wherein the indicia reading terminal is further operative so that responsively to a trigger signal activation the indicia reading terminal captures the first and second and third frames, the second frame being captured subsequently to a capture of the first frame, the third frame being captured subsequently to a capture of the second frame.

2. The indicia reading terminal as set forth in claim 1, wherein the indicia reading terminal is operative so that the first frame and the second frame are successively captured frames.

3. The indicia reading terminal as set forth in claim 1, wherein the indicia reading terminal is operative so that the terminal changes a lens setting of the lens assembly between the first lens setting and the second lens setting on an open loop basis irrespective of a sensed condition.

4. The indicia reading terminal as set forth in claim 1, wherein the indicia reading terminal is operative so that the terminal changes a lens setting of the lens assembly between the first lens setting and the second lens setting responsively to sensed terminal to target distance.

5. The indicia reading terminal as set forth in claim 1, wherein there is associated with the first and second lens settings at least one control in addition to picture size, the additional control being an operational parameter.

6. The indicia reading terminal as set forth in claim 1, wherein there is associated with the first and second lens settings at least one control in addition to picture size, the additional control being an operational parameter selected from the group consisting of an exposure parameter, and an amplifier gain parameter.

7. The indicia reading terminal as set forth in claim 6, wherein the exposure parameter is an initial exposure, and wherein the amplifier gain parameter is an initial gain parameter.

8. The indicia reading terminal as set forth in claim 1, wherein there is associated with the first and second lens settings at least one control in addition to picture size, the additional control being a process selected from the group consisting of an exposure parameter determination process and a gain determination process.

9. An indicia reading terminal comprising:
an image sensor including an image sensor array having a plurality of pixels;
a variable setting lens assembly for focusing light on the image sensor array, the variable setting lens assembly having a first lens setting at which the terminal has a first plane of optimum focus and a second lens setting at which the terminal has a second plane of optimum focus;
wherein the indicia reading terminal is operative in a first operator selectable operating state and a second operator selectable operating state;
wherein the indicia reading terminal during an operator initiated read attempt in the first operator selectable operating state is operative to vary the lens setting of the lens assembly between a first lens setting and a second lens setting, wherein the indicia reading terminal is further operative in the first operator selectable operating state so that frames exposed with the lens assembly at the first lens setting have a first picture size and further so that frames exposed with the lens assembly at the second lens setting have a second picture size different from the first picture size;
wherein the indicia reading terminal during an operator initiated read attempt in the second operator selectable operating state is operative to vary the lens setting of the lens assembly between a first lens setting and a second lens setting, wherein the indicia reading terminal is further operative in the second operator selectable operating state so that frames exposed with the lens assembly at the first lens setting and frames exposed with the lens assembly at the second lens setting have a common picture size.

10. An indicia reading terminal comprising:
an image sensor including an image sensor array having a plurality of pixels;
a variable setting lens assembly for focusing light on the image sensor array, the variable setting lens assembly having a first lens setting at which the terminal has a first plane of optimum focus and a second lens setting at which the terminal has a second plane of optimum focus;
wherein the indicia reading terminal is operative to expose a first frame with the lens assembly at the first lens setting and is further operative to expose a second frame with the lens assembly at the second lens setting;
wherein the indicia reading terminal is further operative to attempt to decode a decodable indicia by processing at least one of the first frame and second frame;

wherein the indicia reading terminal is operative so that during an operator initiated read attempt the terminal exposes a first plurality of frames with the lens assembly at the first lens setting and a second plurality of frames with the lens assembly at the second lens setting, wherein the terminal is further operative so that during the operator initiated read attempt the terminal switches a lens setting of the lens assembly from the first lens setting to the second lens setting and back to the first lens setting so that there are exposed a plurality of frames with an alternating pattern of lens setting associations;

wherein the indicia reading terminal is further operative so that when executing a process for determining an operational parameter to be applied for a next frame with the lens setting at the first lens setting, the terminal preferentially utilizes a prior frame having as an associated lens setting the first lens setting.

11. The indicia reading terminal as set forth in claim 10, wherein the terminal when preferentially utilizing a prior frame having an associated lens setting the terminal discards a prior frame having as an associated lens setting the second lens setting.

12. The indicia reading terminal as set forth in claim 10, wherein the process for determining an operational parameter is a process for determining an amplifier gain for the next frame.

13. An indicia reading terminal comprising:
an image sensor including an image sensor array having a plurality of pixels;
a variable setting lens assembly for focusing light on the image sensor array, the variable setting lens assembly having a first lens setting at which the terminal has a first plane of optimum focus and a second lens setting at which the terminal has a second plane of optimum focus and a third lens setting at which the terminal has a third plane of optimum focus, the third plane of optimum focus being farther than the second plane of optimum focus, the second plane of optimum focus being farther than the first plane of optimum focus;
wherein the indicia reading terminal is operative to expose a first frame with the lens assembly at the first lens setting and is further operative to expose a second frame with the lens assembly at the second lens setting and is further operative to expose a third frame with the lens assembly at the third lens setting;
wherein the indicia reading terminal is further operative to attempt to decode a decodable indicia by processing each of the first frame the second frame and the third frame;
wherein the indicia reading terminal is further operative so that there is associated with the first lens setting a first picture size defined by a first set of pixel values corresponding to the first set of pixels of the image sensor array and further so that there is associated with the second lens setting a second picture size defined by a second set of pixel values of the image sensor array and further so that there is associated with the third lens setting a third picture size defined by a third set of pixel values corresponding to a third set of pixels of the image sensor array, the third picture size being larger than the first picture size and the second picture size being larger than the first picture size, wherein the indicia reading terminal is operative so that a frame exposed with the lens assembly at the first lens setting has the first picture size and further so that a frame exposed with the lens assembly at the second lens setting has the second picture size and further being operative so that a frame exposed with the lens assembly at the third lens setting has the third picture size, wherein the first set of pixels includes pixels of each row the second set of pixels, and wherein the second set of pixels includes pixels of each row of the third set of pixels, wherein the indicia reading terminal is operative so that responsively to activation of a trigger signal the indicia reading terminal captures the first second and third frames.

14. The indicia reading terminal as set forth in claim 13, wherein the indicia reading terminal is operative so that the terminal changes a lens setting of the lens assembly between the first lens setting and the second lens setting and the third lens setting on an open loop basis irrespective of a sensed condition.

15. The indicia reading terminal as set forth in claim 13, wherein the indicia reading terminal is operative so that the terminal changes a lens setting of the lens assembly between the first lens setting and the second lens setting and the third lens setting responsively to sensed terminal to target distance.

16. The indicia reading terminal as set forth in claim 13, wherein there is associated with the first and second lens settings at least one control in addition to picture size, the at least one control in addition to picture size being an operational parameter.

17. The indicia reading terminal as set forth in claim 13, wherein there is associated with the first and second lens settings at least one control in addition to picture size, the at least one control in addition to picture size being an operational parameter selected from the group consisting of an exposure parameter, and an amplifier gain parameter.

18. The indicia reading terminal as set forth in claim 17, where the exposure parameter is an initial exposure, and wherein the amplifier gain parameter is an initial gain parameter.

19. The indicia reading terminal as set forth in claim 13, wherein there is associated with the first and second lens settings at least one control in addition to picture size, the at least one control in addition to picture size being a process selected from the group consisting of an exposure parameter determination process and a gain determination process.

* * * * *